Nov. 1, 1966   R. W. WARD   3,283,321
FM-CW DOPPLER RADAR
Filed Jan. 6, 1964

INVENTOR.
Raymond W. Ward
BY Mueller and Aichele
Attys

United States Patent Office 3,283,321
Patented Nov. 1, 1966

3,283,321
FM-CW DOPPLER RADAR
Raymond W. Ward, Northbrook, Ill., assignor to Motorola, Inc., Franklin Park, Ill., a corporation of Illinois
Filed Jan. 6, 1964, Ser. No. 335,717
3 Claims. (Cl. 343—14)

This invention relates generally to a radar system and in particular to a continuous wave, frequency modulation system for obtaining the range and radial velocity of a moving target.

Continuous wave (CW) radar systems are in frequent use for obtaining the velocity of targets by measuring the Doppler shift of a return signal from the moving target. Other forms of radar systems have been developed which will measure the range of a target but they will not distinguish a moving target from a stationary target without complex equipment too bulky to be easily carried and used. It is desirable to combine the advantages of the different types of radar systems and to obtain from a simple compact CW frequency modulation (FM) radar system both range information and moving target information.

Accordingly, it is an object of this invention to provide an FM-CW radar system which is simple in construction and operation and which will provide information about moving targets located at a particular range.

Another object of the invention is to provide an FM-CW radar system which will provide information about moving targets at a plurality of ranges.

Another object of this invention is to provide an FM-CW radar system which will measure the radial velocity of a moving target at a particular range.

A feature of this invention is the provision of an FM-CW radar system for obtaining range and moving target informaiton and having a mixer for mixing the transmitted and received signals to obtain a difference signal having frequency spectral components which are a function of the range to the target producing the received signal.

Another feature of this invention is the provision of an FM-CW radar system with a Hall multiplier for multiplying the detected received signal and a periodic local signal, and an audio filter for filtering the resultant signal, to produce an output signal having moving target information including the radial velocity of the moving target.

Another feature of this invention is the provision of a CW radar system with a video filter to compensate for differences in the strength of the received signals due to different signal path lengths.

In practicing this invention a source of radio frequency energy, frequency modulated by a signal having a periodic function, is coupled to an antenna by means of a circulator. The energy thus coupled is radiated and is reflected from both stationary and moving objects. The reflected radio frequency energy is received on the same antenna and coupled through the circulator to the receiver portion of the radar system.

In the radar receiver an attenuated portion of the transmitted signal is mixed with the received signal to produce a resultant signal having a frequency dependent upon the time taken by the received signal to travel to the target and return. The mixed signal is coupled to a Hall multiplier where it is multiplied by a sine wave signal having a frequency which is an integral multiple of the frequency of the modulating signal. The output signal of the Hall multiplier consists of a pair of frequencies equal to the sum and difference of the input frequencies. This output is coupled to an audio band pass filter which rejects the sum frequency. By proper choice of the frequency of the sine wave signal, dependent upon the range of the target about which information is desired, the frequency of the difference output signal from the Hall multiplier is reduced to zero if the target is stationary. For moving targets the Doppler shift of the return signal produces a difference output signal from the Hall multiplier which has a frequency in the audio range. This audio frequency is coupled to a utilization circuit by a band pass filter. The frequency of the local signal determines the range at which the target is located and the audio frequency is a measure of the Doppler shift and thus a measure of the radial velocity of the target. If the local signal contains a plurality of frequencies, as for example a signal having the same periodic function as the modulating signal, a plurality of range increments can be observed at one time.

Figure 1:
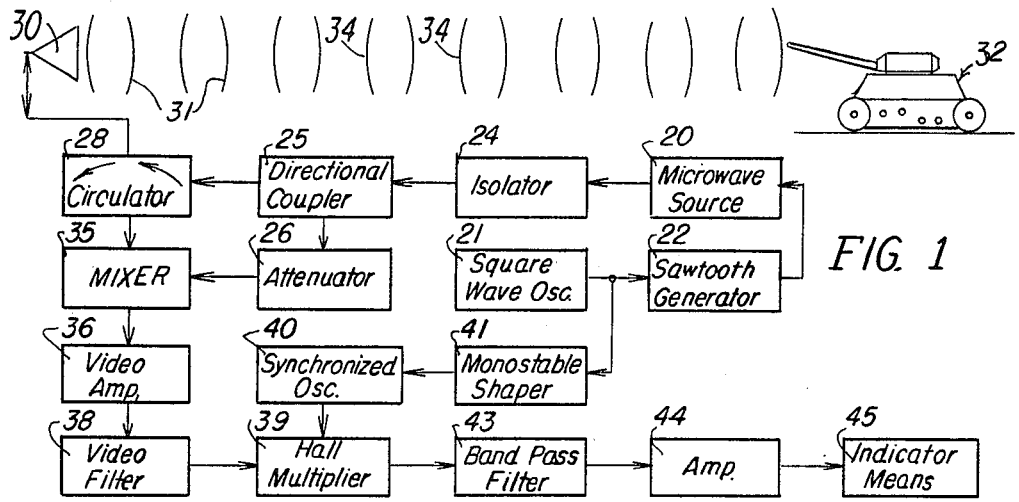
FIG. 1 is a block diagram of an FM-CW radar system incorporating the features of this invention.

An FM-CW radar system incorporating the features of this invention is illustrated in FIG. 1. In this example a source of microwave energy 20 is frequency modulated by a signal of sawtooth wave form having a frequency FM, with a period equal to $1/fm$. This signal may be generated by square wave oscillator 21 and saw tooth generator 22. The output of the microwave energy source 20 is coupled to directional coupler 25 and by isolator 24. A small portion of the energy is coupled from directional coupler 25 to attenuator 26 and the remaining energy is coupled to circulator 28. Circulator 28 couples the energy to antenna 30 where it is radiated. The radiated signal 31 is reflected from a target 32 and this reflected energy 34 returns to the antenna 30. The energy received by the antenna is coupled through circulator 28 to mixer 35 where it is mixed with the attenuated transmitted signal.

Figure 2:
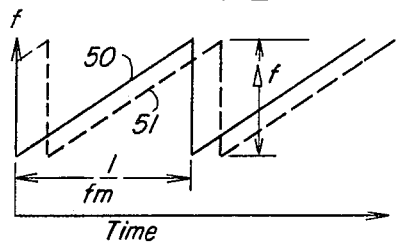
FIG. 2 is a curve showing the frequency of the transmitted and received signals of the radar systems as a function of time.
Figure 3:
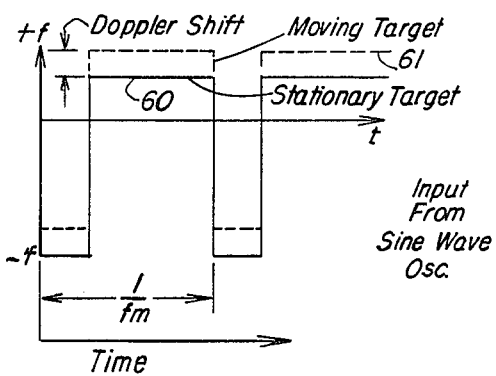
FIG. 3 is a curve showing the difference frequency output from the mixer as a function of time.

Referring to FIG. 2, the modulation of the source of microwave energy is shown as a plot of frequency vs. time. The transmitted energy is shown in curve 50. The received signal will vary in frequency with the same periodic function as the transmitted wave, but it will be delayed in time because of the time taken to travel from the antenna to the target and return. The received wave is shown in FIG. 2 as curve 51. FIG. 3 shows a plot of the difference frequency between the received and transmitted waves, the output of mixer 35, as a function of time. Curve 60 of this figure shows the difference frequency produced by a stationary target.

Figure 4:
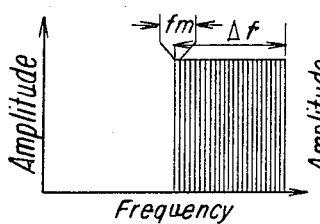
FIG. 4 illustrates the spectral density of the transmitted radar signal.

FIG. 4 shows the power spectral density of the transmitted signal, and is a plot of amplitude vs. frequency. It can be seen that the transmitted wave has its power equally distributed at points separated by the modulating frequency, $fm$, over a frequency range equal to the frequency deviation $\Delta f$.

Figure 5:
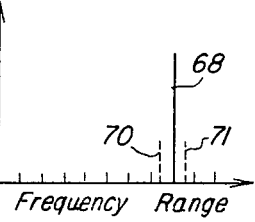
FIG. 5 illustrates the spectral density of the output of the mixer for a signal received from a single target.

Curve 68 of FIG. 5 shows the power spectral density of the output of mixer 35 when the received signal is reflected from a single stationary target. Since the difference frequency output of mixer 35 is periodic, with a period of $1/fm$, all the spectral components are located at integral multiples of $fm$. Since the frequency modulation, except at close range, has a large index of modulation most of the energy from the target at range $r$ will be in the corresponding spectral line closest to that range as is shown by curve 68 of FIG. 5. When a moving target is encountered the difference frequency is displaced by the Doppler shift as shown by the dotted curve 61 of FIG. 3. This Doppler shift creates side bands about the spectral line corresponding to curves 70 and 71 of FIG. 5.

Referring again to FIG. 1, the output of the mixer is amplified in video amplifier 36 and coupled to video filter 38. Video filter 38 removes the large negative difference frequencies shown in FIG. 3, and equalizes the differences in the amplitude of the returning signals due to range difference. The output of video filter 38 is coupled to Hall multiplier 39. A local input signal to Hall multiplier 39 is obtained from a synchronized oscillator 40. The output of this oscillator 40 is synchronized with the square wave oscillator 21 by a monostable shaper 41. Synchronized oscillator 40 can be adjusted so that its output is a sine wave having a frequency equal to an integral multiple of the frequency of square wave oscillator 21, or its output can contain a plurality of frequencies harmonically related to $fm$. An example of this latter output would be a periodic function similar to the periodic function modulating microwave source 20.

Figure 6:
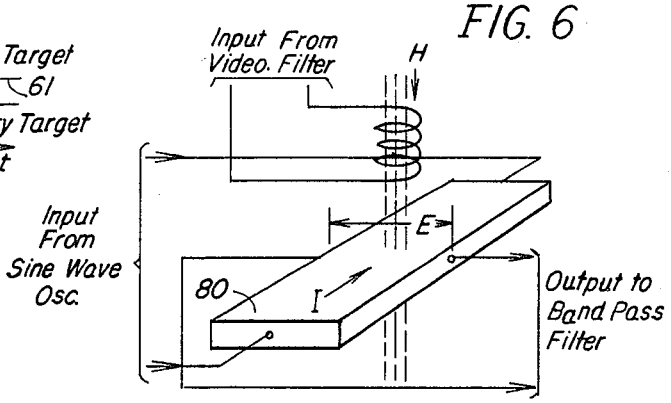
FIG. 6 illustrates the operation of the Hall multiplier used in this invention.

Hall multiplier 39 is shown in FIG. 6. The Hall element 80 is formed by a semiconductor material and has the properties that a magnetic field H directed through the Hall element perpendicular to the direction of current I will produce a voltage E along an axis perpendicular to the magnetic field and the current. In the device used in this system the magnetic field H is developed by a coil through which the input current from video filter 38 of FIG. 1 flows. The current I through Hall element 80 is obtained from oscillator 40 of FIG. 1. The output voltage from the Hall element is coupled to band pass filter 43 and is a signal composed of the sum and difference frequencies of the inputs to the Hall multiplier.

If the target is stationary, the signal applied to Hall multiplier 39 from video filter 38 will be an integral multiple of $fm$. If the local signal from oscillator 40 is a sine wave, the sum and difference frequencies will be integral multiples of $fm$. Band pass filter 43 is constructed to reject D.C. signals and signals having a frequency equal to or greater than $fm$. Thus for a stationary target the sum frequencies being always greater than $fm$ will be outside the pass band of filter 43 and will be rejected. Also the difference frequencies of all stationary targets will be equal to zero or equal to or greater than $fm$, and will also be rejected by the band pass filter 43.

If the signal is received from a moving target the Doppler shift will produce side bands which differ in frequency from the spectral line, corresponding to a stationary target at the same range as the moving target, by an amount dependent upon the velocity of the moving target. These side bands are illustrated in curves 70 and 71 of FIG. 5. By selecting a frequency for oscillator 40 so that the difference output of the Hall multiplier would be a direct current for a stationary target appearing at the same range as the moving target a signal will be developed with a frequency dependent upon the velocity of the target. The signal from filter 43 is coupled to amplifier 44 and from the amplifier to indicator 45. Indicator 45 includes a velocity meter to determine the radial velocity of the target by measuring the frequency of the signal from filter 43.

If the local signal from oscillator 40 contains a plurality of frequencies harmonically related to $fm$, moving targets at a plurality of ranges can be detected simultaneously. By using a signal containing a large number of harmonics a large area can be observed for moving targets. When a moving target is located, its range and radial velocity can be determined by switching oscillator 40 to a sine wave output. It should be noted that with a plurality of targets and a plurality of local signal frequencies only moving targets are detected, as in the case where a local signal of one frequency is used.

Consider for example, a system in which $\Delta f$, the deviation of the CW signal, is equal to 7.5 megacycles and $fm$ is equal to 4 kilocycles. Each of the spectral lines are spaced 4 kc. apart and represent 20 meter range increments. A stationary target 500 meters away would cause the energy to be concentrated at the 25th spectral line or at 100 kc. By adjusting the sine wave oscillator 40 to a frequency equal to the 25th harmonic of $fm$, or 100 kc., the sum frequency of the output of the Hall multiplier 39 will be equal to 200 kc. and the difference frequency would be equal to zero. Both of these frequencies are outside the pass band of filter 43 and are thus rejected. A second stationary target 20 meters from the first target would produce a difference signal from the Hall multiplier equal to 4 kc. which would also be outside the pass band of filter 43. Thus all stationary targets produce frequencies which are rejected by band pass filter 43.

Assume the first target is moving at a velocity of 60 miles an hour relative to the antenna of the system. At a frequency of 10 kmc. this velocity will produce a Doppler shift of 1800 cycles per second. Thus the energy returned from the moving target would be contained in side bands at a frequency of 100 kc., plus and minus 1.8 kc. The difference frequency between this signal and the output of sine wave oscillator 40 would now be 1800 cycles per second which is within the pass band of the filter 43. Thus a moving target at the range represented by the 25th harmonic of $fm$ would be detected. However, moving targets at ranges represented by other spectral lines will produce frequencies outside the pass band of filter 43 and would not be detected by the radar system.

Thus, a simple FM-CW radar system has been shown which will detect moving targets and reject stationary ones. The range and radial velocity of the detected target can easily be obtained with this system.

I claim:

1. A continuous wave radar system including in combination, first means for generating a continuous wave radar signal having a frequency which varies as a periodic function of time, antenna means coupled to said first generating means for radiating said radar signal and receiving and translating reflected signals of the same, mixer means coupled to said antenna means and said first generating means for mixing said reflected signal and a portion of said generated signal to produce a difference signal having a frequency equal to the frequency difference between said mixed signals, second means coupled to said first generating means for generating a local signal having a period equal to the period of said periodic function, Hall multiplier means coupled to said mixer means and said second means, said Hall multiplier means being responsive to said difference signal and said local signal to produce output signals having frequencies equal to the sum and difference of said difference signal and said local signal, and band pass filter means coupled to said Hall multiplier means, said filter means being responsive to said output signals to reject frequencies thereof outside a predetermined pass band.

2. A continuous wave radar system including in combination, first means for generating a continuous wave radar signal, modulating means producing a sawtooth modulating wave coupled to said first means for frequency modulating said radar signal, antenna means coupled to said first generating means for radiating said radar signal and receiving and translating reflected signals of the same, mixer means coupled to said antenna means and said first generating means for mixing said reflected signal and a portion of said generated signal to produce a difference signal having a frequency equal to the frequency difference between said mixed signals and a signal strength variation proportional to the frequency of said difference signal, video filtering means coupled to said mixer means to provide compensation for said signal strength variation, second means coupled to said first generating means for generating a local sine wave signal having a frequency equal to an integral multiple of the frequency of said sawtooth modulating wave, Hall multiplier means coupled to said video filtering means and said second means, said Hall multiplier means being responsive to said difference signal and said local signal to produce output signals having frequencies equal to the sum and difference of said difference signal and said local signal, and band pass filter means coupled to said Hall multiplier, said band pass filter means being responsive to said output signals to reject frequencies thereof outside of a predetermined pass band.

3. A continuous wave radar system including in combination, modulating means for generating a linear ramp modulating signal having a first frequency, first generating means coupled to said modulating means and being responsive to said modulating signal to generate a continuous wave radar signal having a second frequency which varies as a function of said modulating signal, antenna means coupled to said first generating means for radiating said radar signal and receiving and translating reflected signals of the same, mixer means coupled to said antenna means and said first generating means for mixing said reflected signal and a portion of said radar signal to produce a difference signal having a frequency equal to the frequency difference between said mixed signals, second generating means coupled to said modulating means for generating a local signal having a single fixed frequency of sinusoidal waveform equal to an integral harmonic of said first frequency, said second generating means further including adjustable tuning means whereby a particular desired harmonic of said first frequency may be selected, signal multiplier means coupled to said mixer means and said second generating means, said signal multiplier means being responsive to said difference signal and said local signal to produce output signals having frequencies equal to the sum and difference of said difference signal and said local signal, and band-pass filter means coupled to said signal multiplier means, said filter means being responsive to said output signals to reject frequencies thereof outside a predetermined pass band.

References Cited by the Examiner
UNITED STATES PATENTS

| | | | |
|---|---|---|---|
| 2,612,636 | 9/1952 | Rust | 343—9 |
| 2,935,743 | 5/1960 | Glegg | 343—8 |

CHESTER L. JUSTUS, *Primary Examiner.*

LEWIS H. MYERS, *Examiner.*

R. D. BENNETT, *Assistant Examiner.*